United States Patent [19]

Philips

[11] 4,176,490
[45] Dec. 4, 1979

[54] HINGED FISHING LURE

[76] Inventor: Nicholas A. Philips, P.O. Box 1273, Traverse City, Mich. 49684

[21] Appl. No.: 869,932

[22] Filed: Jan. 16, 1978

[51] Int. Cl.² ............................................... A01K 85/00
[52] U.S. Cl. ................................. 43/42.15; 43/42.33; 43/42.35
[58] Field of Search ................. 43/42.15, 42.22, 42.32, 43/42.33, 42.34, 42.35, 42.48

[56] References Cited

U.S. PATENT DOCUMENTS

| | | | |
|---|---|---|---|
| 1,892,892 | 1/1933 | Jamar | 43/42.15 |
| 2,008,250 | 7/1935 | Haas | 43/42.15 |
| 2,502,562 | 4/1950 | Fike | 43/42.32 |
| 2,596,883 | 5/1952 | Wise | 43/42.33 |
| 2,674,060 | 4/1954 | Simmons | 43/42.22 X |
| 2,685,145 | 9/1954 | Dean | 43/42.15 |
| 3,392,474 | 7/1968 | De Weese | 43/42.32 X |
| 3,423,868 | 1/1969 | Lemaster | 43/42.15 X |

*Primary Examiner*—Nicholas P. Godici
*Attorney, Agent, or Firm*—Charles A. Laff; J. Warren Whitesel; Howard B. Rockman

[57] ABSTRACT

A fishing lure has a two-piece body which is hinged together at a central region, with the hinge being vertically oriented. The hinge has enough play to enable slight twisting motion in the tail region. The lure floats upright when the hooks rest upon the bottom. One embodiment simulates a dying fish. The lure sinks away from its attached line in order to reduce snagged lines.

9 Claims, 6 Drawing Figures

BOTTOM OF WATER

HINGED FISHING LURE

This invention relates to fishing lures and more particularly to more realistic lures with improved non-snag characteristics.

Fishing lures are often made in a form and size which simulates the natural food of the fish being sought. Very often, this food is a smaller fish, which may have certain habits, movements, or behavior patterns which are characteristic of the species. Most likely, the fisherman will have the best luck if he uses a lure which closely simulates these characteristics.

Heretofore, the lures made to simulate the action and habit patterns of small fish did not adequately simulate their action. For example, the lures have commonly been made in two pieces with an interconnecting pivot point (such as two interlocking eyes) between them. The rear parts of these lures have tended to have a twirling or circular motion which natural fish do not have. When these prior lures floated as dead or dying fish might float, they tended to stand upright instead of floating on the side. When these lures dived from a floating to an underwater position, they did not flip their tails the way fish usually do.

Also, prior lures have had hooks which sometimes snagged and entangled their lines. When they rested on the bottom, their hooks tended to snag things and to become entangled with them. Near the bottom, the lures tended to lose all of their fish-like characteristics.

Accordingly, an object of the invention is to provide new and improved fishing lures which more nearly simulate the actions and behavior patterns of real fish. Here, an object is to provide lures which tend to sink, at rates approximating the sink rate of natural fish, with diving and flipping movements as with a normal fish.

Another object is to provide lures which sink to and then float at a level immediately above the bottom of a body of water.

Yet another object of the invention is to provide lures which behaves as a dying fish behaves.

Still another object of the invention is to provide lures which do not tend to snag their associated fishing line, as easily as they have heretofore done. Here an object is to provide a lure which sinks away from their attached lines. Another object is also to provide lures which stand off—and do not snag—the bottom.

In keeping with an aspect of this invention, these and other objects of the invention are accomplished by a two-piece fishing lure having a central hinge which is pivoted along an axial line that is perpendicular when the lure is in an upright position. Therefore, the tail may move back and forth in a generally wagging motion. The inventive fishing lure includes internal cavities which balance the fish relative to the weight of the hooks so that the lure will sink away from the fisherman, with the tail down to avoid snagging the line. When the hooks rest on the bottom, the lure floats in an upright position. A dying fish lure has slightly larger cavities and a center of gravity positioned to make it float on its side. A larger than normal diving plane is used with the dying fish lure so that it dives suddenly, with a flip of the tail, when the line is tugged suddenly.

A preferred embodiment of the invention is shown in the attached drawing, wherein.

Figure 1:
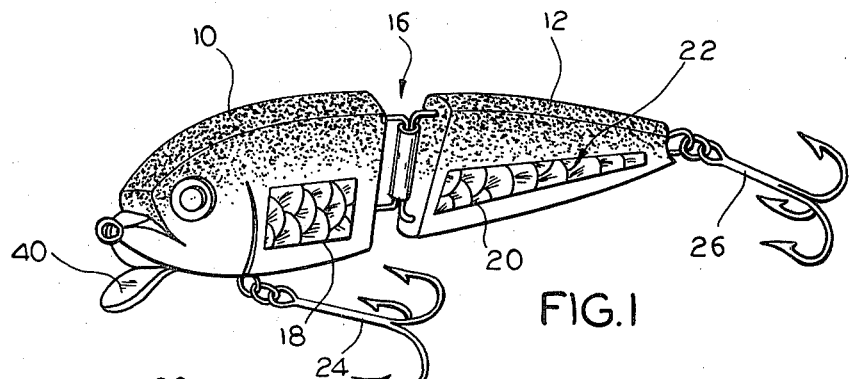
FIG. 1 is a perspective view of the inventive lure.

The major parts of the inventive lure are a head 10 and tail 12 (or the fore and aft parts of a fish), hinged together along a linear axis 16, to form a lure in the general shape and form of a fish. A generally silver-colored reflective, metalized tape 18,20 is cemented to opposite sides of both the head 10 and tail 12 sections. This tape has a plurality of overlapping spin finish, circular or arcuate patterns 22 formed thereon. The circular arcs face toward the rear, much as the scales of a fish have generally arcuate sections facing the rear. These spin finish patterns may be formed in any convenient and known manner, simulating the lines formed by scoring metal with a rotary mandrel.

The top of the lure is then spatter-painted with black, over a basic gray plastic. Preferably, the spattering shades from dark at the top of the lure or spine of the fish shape to light near the top of the tape 18,20. An alternative is to wipe on the paint with a darker paint at the top of the lure. The paint is nearly wiped clean, near the top of the tape 18,20.

Any suitable number of hooks may be hung from the lure, as shown at 24,26.

Figure 2:
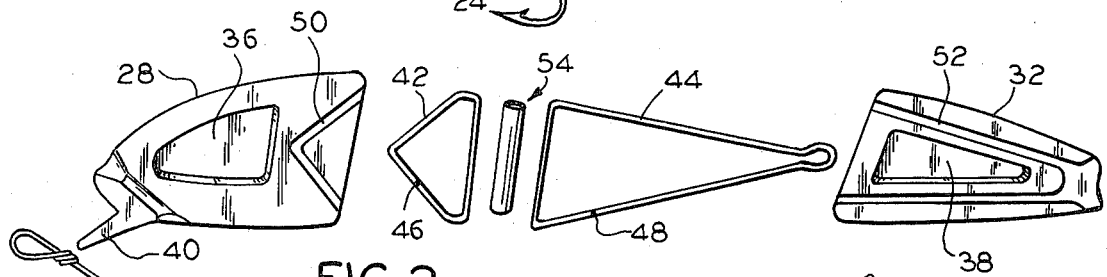
FIG. 2 is an exploded view of one side, of a hinge, and of a leader used in the inventive lure.
Figure 3:
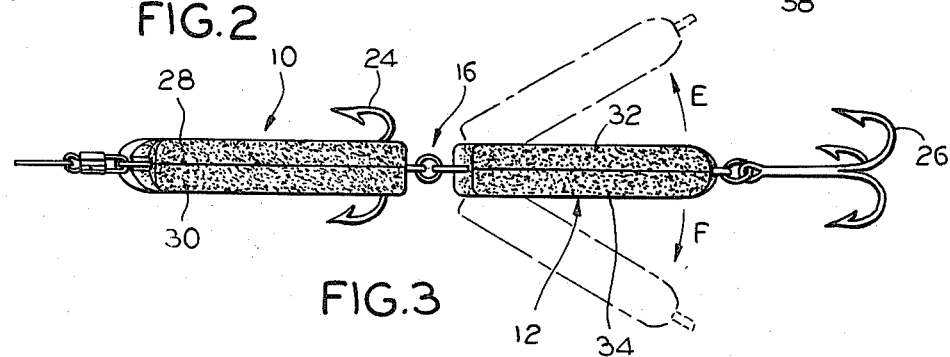
FIG. 3 illustrates how the lure is articulated when it is pulled through the water.

The body of the fish is made from opposing molded plastic parts 28-34 (FIG. 3) which are cemented together in a face-to-face relationship. FIG. 2 shows two of these plastic body parts 28,32. The other two parts 30,34 are mirror images thereof. The plastic used to make these parts is slightly heavier than water (i.e., preferably approximately 110% the weight of water). Therefore, buoyance cavities 36,38 may be molded into the body parts in order to very precisely control the weight and center of gravity of the lure.

The sizes of the buoyance cavities 36,38 vary with the desired results (i.e., the lure may be a "sinking" or a "floating" device).

Figure 6:
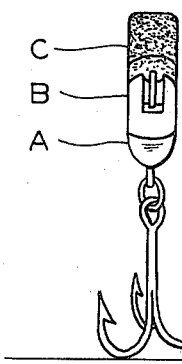
FIG. 6 is a front elevation which illustrates how the lure floats off the bottom.

For the sinking type of lure, the cavities 36,38 are relatively high in the body to give a low center of gravity A (FIG. 6) whereby the lure floats in a stable upright position. This means that the lure almost never lies on its side and almost always assumes the upright stability of a healthy fish.

The cavities 36,38 are large enough to cause the lure to float when it is not loaded with the weight of the hooks 24,26. However, the cavities are also small enough to cause the lure to sink slowly when loaded under the weight of the hooks. With the hooks 24,26 in position, the center of gravity is shifted toward the rear of the lure. Thus, the weight distribution is selected so that, if the line is not pulled, the lure sinks slowly with its head higher than its tail. This way, the lure tends to sink away from the line, which is thereby held somewhat taut so that the hooks do not easily become entangled in the line.

When the lure is a "floater," the body is made slightly larger to enclose a much larger pair of body cavities. The displacement of the lure is such that the lure floats on the surface, if the line is not pulled. Also, in the floater, the cavities are formed much lower in the body parts so that the center of gravity is sufficiently above longitudinal axis of the lure (position C in FIG. 6) so that, with the added weight of the hooks, the center shifts to the axis (position B). This means that this version of the lure tends to float on its side, much as a dying fish floats. The cavity in the head is greater and the cavity in the tail is lesser so that the tail droops, much as the tail of a dying fish droops.

The front of the lure includes a diving plane which is inclined at an angle so that the lure dives downwardly when the line is pulled sharply.

Figure 5:
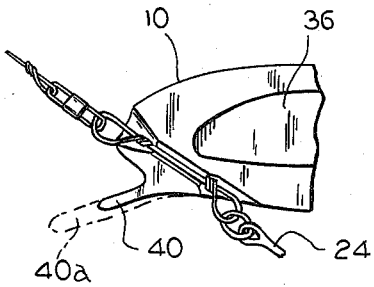
FIG. 5 is a fragmentary view of one side of the head section which graphically illustrates how the diving plane may be modified to produce different effects.
Figure 4:
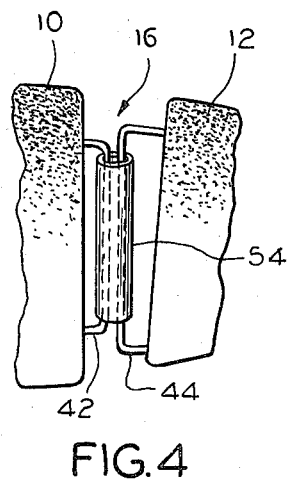
FIG. 4 is an enlarged side elevation view of the hinge which articulates the lure.

As shown by dotted lines 40a in FIG. 5, as compared to the solid lines 40, the diving plane is made much larger in the floater, as compared to the sinker. This is because a greater force is required to submerge a floating lure, than is required to submerge the sinking lure.

The body sections are interconnected by hinges made of wire loops 42,44 which are preferably soldered together at their ends 46,48 in order to make a stronger structure. These loops lie in grooves 50,52 formed in the body parts. When opposing body parts are cemented together, the wire loops are snugly captured. This way, the parts are freely hinged and there is virtually no other mechanical play between the wire loops and the body parts.

The straight vertical sections of the two wire loops 42,44 pass through the center of a hollow metal tube 54 in order to form a hinged section 16. The inside diameter of the tube 54 is large enough (as compared to the outside diameter of the wire loops 42,44) to enable the body parts to pivot freely, with respect to each other in directions E,F (FIG. 3) with a very minor amount of non-hinged or twisting motion. The amount of twisting motion may be closely controlled so that the lure has only that amount of such motion which a swimming fish normally displays. Thus, when pulled through the water, the lure has the motion indicated in FIG. 3, which closely simulates the movement of a slowly swimming fish.

If the line is pulled with a jerking motion, the diving plane 40 causes the lure to dive with each jerk. If a "floater" lure is attached to the line as it is jerked, the diving plane 40a is large enough to cause the head 10 to dive sharply, which lifts the tail 12 slightly out of the water. This flips the tail and causes it to splash on the surface.

If the line to the "floater" is allowed to go slack, the lure slowly rises, turns on its side and allows its tail to droop, thereby simulating the most conventional movement of a dying fish.

Those who are skilled in the art will readily perceive how the invention may be modified. Therefore, the appended claims are to be construed to include all equivalents falling within the true scope and spirit of the invention.

I claim:

1. A fishing lure in the approximate shape and form of a fish, said lure comprising first and second body parts dimensioned to simulate the fore and aft parts of a fish, hinge means joining said parts together, said hinge means comprising two wire loops individually associated with the fore and aft parts, straight vertical sections in each of said loops positioned in a spaced parallel relationship, an elongated tube enclosing said vertical sections substantially throughout their length, the internal diameter of said tube having a relationship with the external diameter of said wire loops which enable said body parts to pivot freely with a limited amount of non-hinged twisting motion, to enable said first and second parts to move back and forth with a tail-wagging motion which is restricted primarily to virtually a single plane with a slight twisting motion, cavities formed in said body parts to form buoyance chambers which control the level at which said lure floats, and at least one hook attached to said lure.

2. The lure of claim 1 wherein said buoyance cavities fix the weight vs. displacement ratio of said lure so that it floats when said hook rests upon and is supported by the bottom.

3. The lure of claim 1 wherein the weight of said lure is distributed so that said lure sinks with the tail moving somewhat downwardly as compared with the level of the head so that the lure tends to sink away from the line to which it is attached in order to tend to preclude snagging the line with the hook.

4. The lure of claim 1 wherein the weight of said lure is distributed in order to provide a center of gravity which is relatively low in the body of said lure so that it moves through the water in a stable upright position, simulating the swimming of a fish.

5. The lure of claim 1 wherein the weight of said lure is distributed so that the center of gravity lies along a longitudinal axis of the body of said lure and the total weight of the lure is less than the weight of the displaced volume of water, whereby the lure tends to float on its side with its tail drooping in the water.

6. The lure of claim 5 and a diving plane in the fore part whereby the lure dives when a line attached to the lure is jerked through the surrounding water, said diving plane having a size and shape which causes the head to dive fast enough to slightly lift the tail out of the water, whereby said lure dives from the surface with a flip of the tail.

7. The lure of claim 1 wherein the body parts are a dark color at the top, fading into light basic body color near the middle and a metallic silver tape with a repeated spin finish secured on each side of each of said body parts in the region where the dark color has faded into the basic body color.

8. The lure of claim 1 wherein said buoyance cavities adjust the weight of said lure so that it floats when said hook is supported on the bottom, the total weight of said lure being distributed so that said lure sinks with the tail moving somewhat downwardly as compared with the level of the head so that the lure tends to sink away from the line, the weight of said lure being further distributed to provide a center of gravity which is relatively low in said lure so that said lure moves stably through the water in an upright position, much as a fish swims.

9. The lure of claim 1 wherein the weight of said lure is distributed so that the center of gravity lies along a longitudinal axis of the body and the total weight of the lure is less than the weight of the displaced volume of water, whereby the lure tends to float on its side, with the tail drooping into the water, and diving plane means formed on the head region of said lure whereby the lure dives when pulled through the surrounding water, said diving plane having a size and shape which causes the head to dive fast enough to slightly lift the tail of the lure out of the water, whereby said lure dives from the surface with a flip of the tail which tends to splash on the surface.

* * * * *